US008918081B2

(12) United States Patent
Brewer et al.

(10) Patent No.: US 8,918,081 B2
(45) Date of Patent: *Dec. 23, 2014

(54) SECURE REMOTE CONTROL OF NOTIFICATION OPERATIONS OF COMMUNICATION DEVICES

(71) Applicant: International Business Machines Corporation, Armonk, NY (US)

(72) Inventors: Derek Ryan Brewer, Rochester, MN (US); Michael Andrew Bockus, Austin, TX (US); Gordon Bockus, Jr., Austin, TX (US); Robert Dale Wilhelm, Cheyenne, WY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,388

(22) Filed: Nov. 23, 2013

(65) Prior Publication Data

US 2014/0080452 A1   Mar. 20, 2014

Related U.S. Application Data

(63) Continuation of application No. 13/238,344, filed on Sep. 21, 2011.

(51) Int. Cl.
*H04W 12/12* (2009.01)
*H04W 12/06* (2009.01)
*H04W 4/16* (2009.01)
*H04W 12/10* (2009.01)
*H04L 29/06* (2006.01)

(52) U.S. Cl.
CPC ............... *H04W 12/06* (2013.01); *H04W 4/16* (2013.01); *H04W 12/10* (2013.01); *H04L 63/126* (2013.01)
USPC .......................................... 455/411; 455/419

(58) Field of Classification Search
USPC .................................................. 455/411, 419
See application file for complete search history.

(56) References Cited

U.S. PATENT DOCUMENTS

2006/0063563 A1   3/2006   Kaufman
2007/0206736 A1   9/2007   Sprigg et al.
(Continued)

OTHER PUBLICATIONS

USPTO; Examination Correspondence from a Related U.S. Appl. No. 14/088,389, filed Nov. 23, 2013 by Derek Ryan Brewer.

(Continued)

*Primary Examiner* — Rafael Pérez-Gutiérrez
*Assistant Examiner* — Frank Donado
(74) *Attorney, Agent, or Firm* — Robert H. Frantz; Damion Josephs

(57) ABSTRACT

A network service provider computer remotely overrides and controls user notification settings of a mobile communications device by establishing one or more authentication keys by a server computer for a specific mobile communication device; transmitting the one or more authentication keys to the specific mobile communication device to establish a trusted relationship; responsive to an event or signal requiring overriding of user notification settings, preparing a notification control message including at least one notification control parameter; and transmitting to the specific mobile communications device the notification control message to cause it to implement and override one or more user notification settings according to the at least one notification control parameter.

4 Claims, 5 Drawing Sheets

(56) References Cited

U.S. PATENT DOCUMENTS

| | | |
|---|---|---|
| 2007/0275767 A1* | 11/2007 | Steele .......................... 455/567 |
| 2008/0009327 A1 | 1/2008 | Westwood et al. |
| 2008/0108338 A1 | 5/2008 | Veron |
| 2008/0113657 A1 | 5/2008 | Abu-Amara et al. |
| 2008/0144805 A1* | 6/2008 | Chew ....................... 379/387.02 |
| 2009/0143057 A1* | 6/2009 | Arun et al. .................... 455/418 |
| 2010/0175116 A1* | 7/2010 | Gum ................................ 726/6 |
| 2010/0299721 A1 | 11/2010 | Awamoto |
| 2011/0154481 A1 | 6/2011 | Kilgore et al. |

OTHER PUBLICATIONS

Stackexchange; "set different ringtone style like nokia?", retrieved on Jan. 5, 2014 from http://apple.stackexchange.com/questions/72383.

USPTO; Examination Correspondence from a Related U.S. Appl. No. 13/238,315, filed Sep. 21, 2011 by Derek Ryan Brewer.

USPTO; Examination Correspondence from a Related U.S. Appl. No. 13/238,344, filed Sep. 21, 2011 by Derek Ryan Brewer.

* cited by examiner

SECURE REMOTE CONTROL OF NOTIFICATION OPERATIONS OF COMMUNICATION DEVICES

CROSS-REFERENCE TO RELATED APPLICATIONS (CLAIMING BENEFIT UNDER 35 U.S.C. 120)

This is a continuation application of U.S. patent application Ser. No. 13/238,344, filed on Sep. 21, 2011 by Derek Ryan Brewer, et al.

FEDERALLY SPONSORED RESEARCH AND DEVELOPMENT STATEMENT

None.

MICROFICHE APPENDIX

Not applicable.

INCORPORATION BY REFERENCE

Related U.S. patent application Ser. No. 13/238,344, filed on Sep. 21, 2011 by Derek Ryan Brewer, et al., is hereby incorporated by reference in its entirety.

FIELD OF THE INVENTION

The invention generally relates to systems, methods, and computer program products to securely and remotely modify and control user notification operations of a communication device, such as the ringtone volume and ringtone selection of a cellular telephone.

BACKGROUND OF INVENTION

Mobile communication devices are ubiquitous in societies around the world. In "developed" countries, the pace and demands of a modern economy require users to have one or more cell phones and web-enabled devices, such as pad computers, tablet computers, notebook computers, and laptop computers. In lesser developed countries, the wireless nature allows cell phones to be used in a towns and villages where wired communications do not exist, and their low power nature allows them to be charged using inexpensive solar panels in areas where an electric power grid is non-existent or unreliable. To say the least, mobile communications devices have brought information and communications to every corner of the world.

It is well known on these devices that the user may select many parameters for notifications by the device. Such devices usually have a speaker for audio speech replication which can also be used as a notification device through which "ringtones" are played, and they also often have a vibration or rumble device to allow them to provide tactile notification to a user. Further, a bright light emitting diode (LED) may be provided to flash in patterns, or to illuminate continuously for certain notifications to the user. And, a screen may have parameters that function as user notifications, as well.

For example, a user may select one ringtone for incoming calls from devices in the address book (e.g. "known" callers), another ringtone for incoming calls from unknown callers (e.g. not in the address book), and yet other ringtones for other types of notifications, such as receipt of new short message service (SMS) text messages, updates from social networks (e.g. Twitter™, FaceBook™, MySpace™, Spoke™, LinkedIn™, Google+™, etc.). Additionally, a user can often on these devices combine vibration or rumble characteristics with these notifications (rumble on all received calls and rumble when in silent mode, etc.), as well as screen characteristics (e.g. turn off screen when not in use for X minutes, but turn on screen when incoming call or message is received).

These user notification controls, however, are generally made by the user directly on the device, and are under little or no control of the network service provider. The control exerted by the network service provider is usually limited to controlling the availability of downloadable and pre-loaded ringtones.

SUMMARY OF THE INVENTION

A network service provider computer remotely overrides and controls user notification settings of a mobile communications device by establishing one or more authentication keys by a server computer for a specific mobile communication device; transmitting the one or more authentication keys to the specific mobile communication device to establish a trusted relationship; responsive to an event or signal requiring overriding of user notification settings, preparing a notification control message including at least one notification control parameter; and transmitting to the specific mobile communications device the notification control message to cause it to implement and override one or more user notification settings according to at least one notification control parameter.

BRIEF DESCRIPTION OF THE DRAWINGS

The several embodiments according to the present invention described herein are illustrated by the several drawings.

DETAILED DESCRIPTION OF EMBODIMENT(S) OF THE INVENTION

Figure 1:
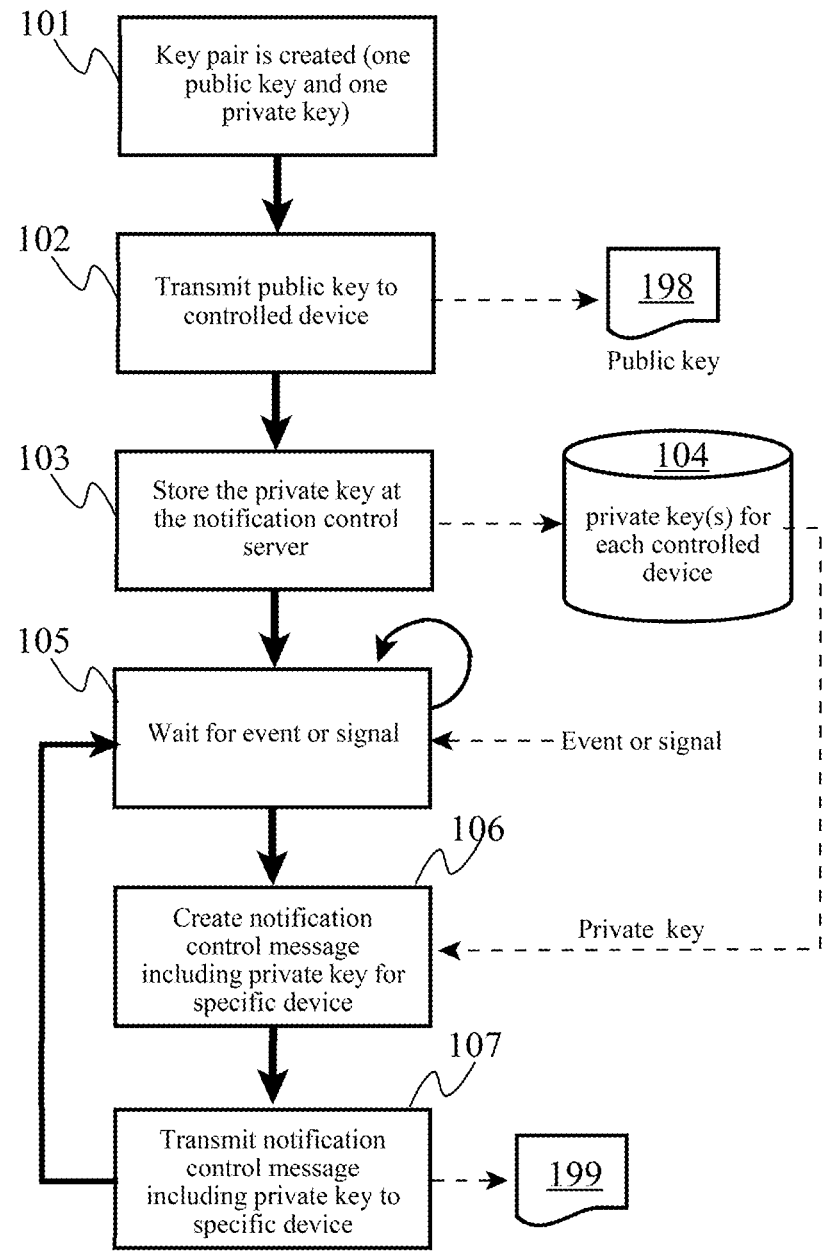
FIG. 1 illustrates the logical processes of a notification control server according to the present invention.

The inventors of the present invention have recognized a problem not yet recognized by those skilled in the relevant arts. While most mobile communications devices provide a wide range of user-settable notification controls and parameters, such as ringtone volume, ringtone selection, rumble enablements and patterns, and screen illumination settings, there is little or no control over these controls provided to the network service providers.

For example, if an urgent notification is required to be sent by a network service provider to a set of cell phones associated with a particular student body of a university in response to an emergency situation, each user will receive the notification according to his or her personal, local notification settings. Some students who are currently in lectures or studying in a quiet environment may have their ringers turned off, so they may not receive timely notice of the campus emergency.

The present inventors have realized that there is an unfulfilled need to provide network service providers (NSP's) with some sort of mechanism, protocol, and method through which an NSP may override the locally-set user notification settings on one or more mobile communications devices.

Further, after realizing that such a capability could be misused by parties other than NSP's, such as by advertisers, the present inventors have recognized that there is a yet-unrecognized and unfulfilled corollary need in the art to provide for security authentication of such a remote notification override capability to prevent unauthorized changes to user's locally-set notification controls.

Embodiments of the present invention allow NSP's to remotely and securely modify the user notification parameters of a mobile communication device, such as the ringtone or alert tone for a cell phone, SMS or paging device. This invention addresses the problem of any situation in which a call, SMS message or (alpha)numeric page may be of such a nature that the currently selected notification tone and/or volume of the device should be changed to increase the odds that the recipient owner of the device is aware of the incoming message. This would be particularly useful in situations where the owner of the device might have the device set to a low volume, set to vibrate only, or set to not make any noise whatsoever, but a message of importance should be noted despite the low or zero volume condition.

An additional scenario of particular use of embodiments of the present invention is that of a device owner who has become so accustomed to the sound of an alert that they might not notice the notification sounding, or the alert notification ringtone they have selected is either not long enough in duration or irritating enough to awaken them in the middle of the night to respond to the device.

Also included in some embodiments of the invention is a method by which the remotely changed ringtone and/or volume increase is set back to the previous settings immediately or within a preset time period.

Another aspect of certain embodiments of the present invention is that the remotely-commanded notification parameters change is automatically authenticated without requiring user interaction.

Yet another aspect of certain embodiments of the present invention is that it's operation is independent of the location of the mobile communications device.

Embodiments of the present invention uses transmission of pre-defined authentication keys as a notification control message or as a part of a notification control message to securely prove identity of the remote sender, and to establish authorization to the receiving device for making the overriding changes to the current user notification settings. Upon receipt of these credentials, the receiving mobile communications device initiates a resident function to make changes to the selected notification tone and/or the volume of the device. In one embodiment, these override settings would be pre-defined by the user of the device, though other embodiments may employ methods by which a specific ringtone could be sent to the end device or a ringtone on the device could be selected using a scale in which the existing ringtones are analyzed for length and a loudness/annoyance level. For example, the owner may define to the device that when a message containing the authentication key arrives, the notification tone should be set to "really annoying beeps" and the volume should be set to "maximum".

Alternatively, a default setting may be used which simply increases the volume, automatically selects a default notification tone to use, or both. Existing ringtones on the phone might be analyzed by a resident function, with a default assigned to the ringtone found to have both the longest length and the highest overall volume. The authentication keys which are used to authenticate the message and consequent changes to the receiving device would likewise need to be pre-defined to the device by the user in such embodiments.

Additionally, some embodiments according to the present invention may also increase the brightness of the device's screen, illuminate LED's, or both, if any of these options are available in order to possibly draw attention to the device.

Logical Processes

Turning now to FIG. 1, an exemplary logical process for a Notification Control Server is shown. Such a logical process may be realized as a processor executing certain program instructions, customized circuitry, or a combination of processor, program instructions and circuitry. Initially, a user interfaces with a system such as the mobile device itself or a web server to create (101) the authentication key pair for his or her mobile communications device. In one embodiment, this would be similar in operation to the creation of Secure Shell (ssh) keys, although alternate methods such as sending a sequence of characters from a touch tone phone may be employed as well. For this exemplary embodiment, the authentication keys are assumed to have been created using software on a computer system or software on the mobile communications device itself.

The generation of keys results in a private key paired to a public key. The private key is used in conjunction with the public key (198) to prove identity when the mobile communications device receives a remote notification change command as will be discussed in the following paragraphs. In this example, the private key is stored (103, 104) on a computer, and the public key (198) is transferred (102) to the device via available means.

After initialization of the keys, the Notification Control Server (e.g. a specially modified or adapted computer system, paging server, messaging server, etc.) waits (105) for an event or signal which requires special notification to the user with an override of the user-specified notification controls, such as an emergency message.

In response to such an event or signal, the Notification Control Server sends a message to the targeted mobile communications device which consists of the authentication keys and possibly other meta information as determined by actual implementation, as will be discussed in more detail in the following paragraphs.

Figure 2:
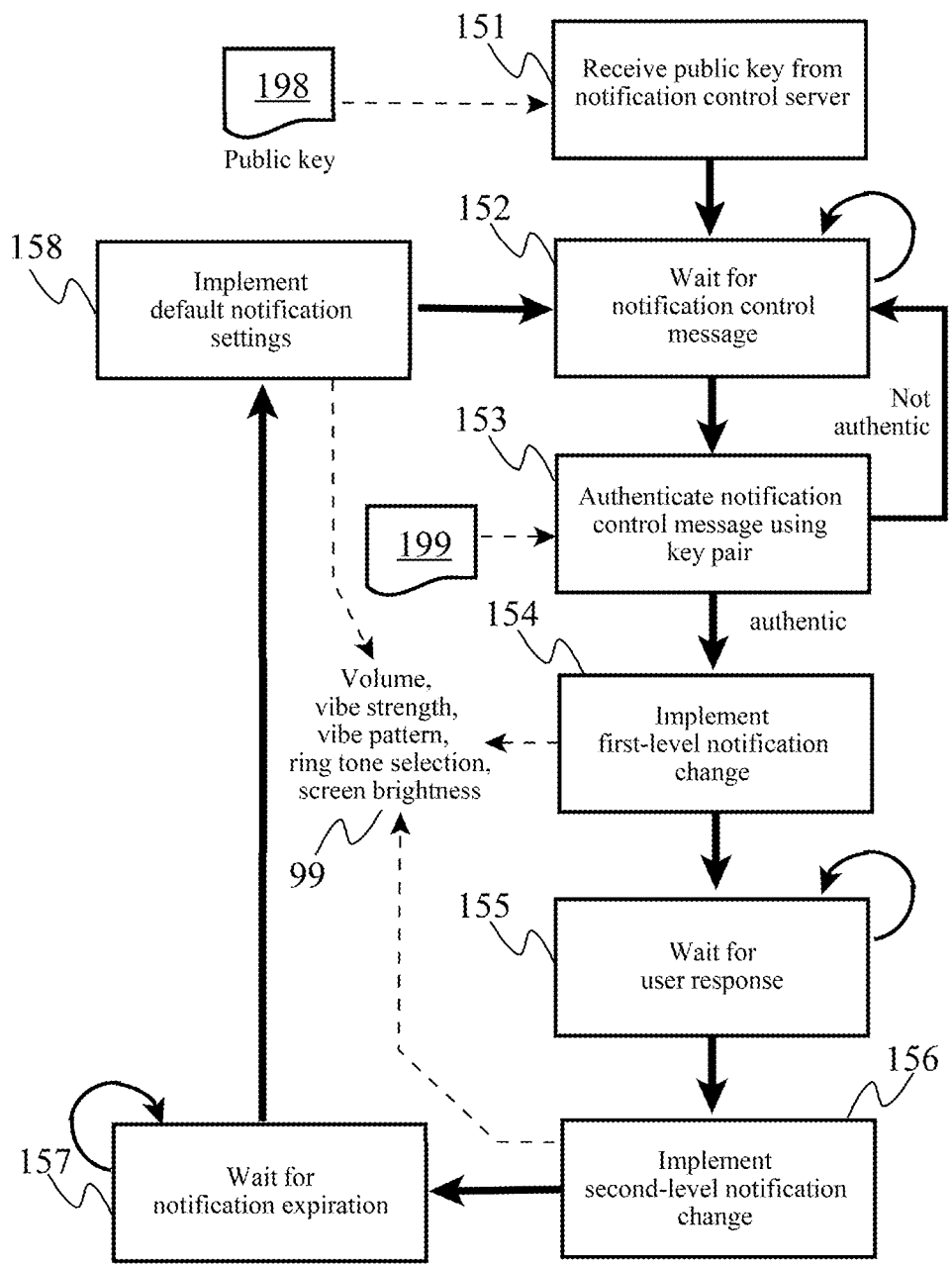
FIG. 2 depicts the logical processes of a mobile communications device that receives and implements user notification control messages according to the present invention.

Turning to FIG. 2, the mobile communications device receives (151) the authentication public key (198) from the key generating source, as previously described, and then waits (152) for a notification control message from the notification control server. A function of the mobile communications device, such as a native operating system function or a downloaded application executed by the processor of the mobile communication device, recognizes this message as related to the present invention, and verifies (153) the authentication key contained in the notification control message (199). If the authentication key does not match, no further action is taken, and the mobile communications device returns to waiting (152) for the next notification control message (199).

However, if the authentication key in the notification control message does match, the mobile communication device then performs (154) the notification override functions according to the invention, such as executing a native operating system function or executing an application program by the processor of the mobile communication device. The override actions may include one or more of the options of increasing the speaker volume to maximum, changing the ringtone via one of the methods described above, and increasing the luminosity of the screen or LEDs on the mobile communication device, if available.

If this is a repeated notification and no interaction with the device has occurred (155), the override function may select (156) another ringtone to use for the next notification, may change a rumble pattern, etc., in order to make a second attempt to draw the user's attention.

According to this exemplary embodiment, the mobile communications device's remote override function then waits a pre-determined period of time (157), and then returns (158) the user notification settings back to their states prior to the implementation (154, 155) of the override settings. Optionally, the override settings may be maintained. Subsequently, the mobile communications device again waits (152) for another notification control message (199) receipt.

Figure 3:
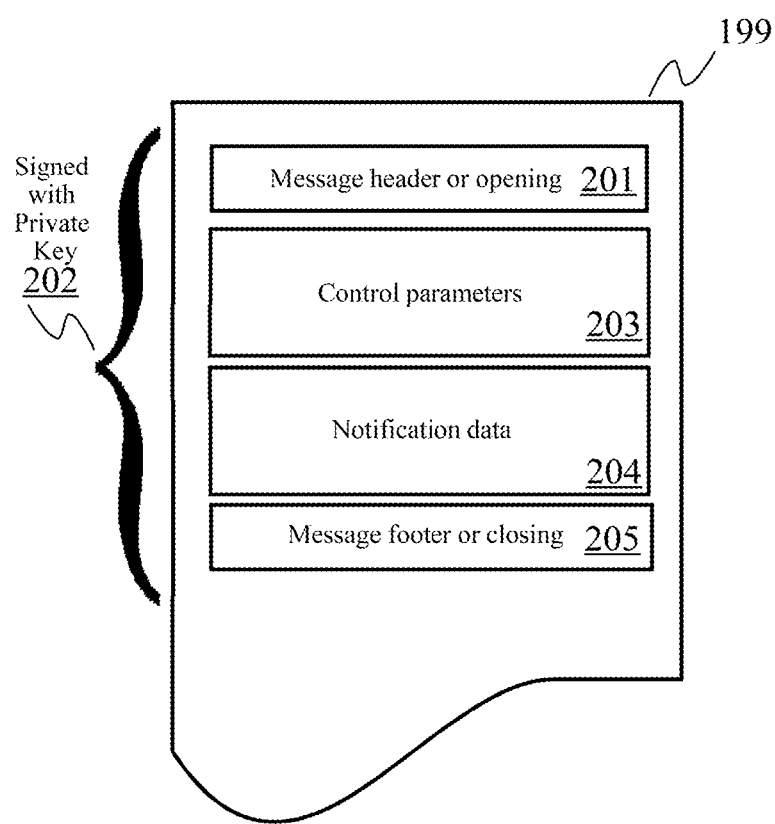
FIG. 3 shows one available embodiment of a user notification control message according to the invention.

Turning now to FIG. 3, an exemplary notification control message (199) is shown. Other formats, schema, and data structures may be implemented within the scope of the present invention, but the example of FIG. 3 should further illustrate the operational concepts of the invention. A message header (201) is included to identify the message as a notification control message, apart from other types of messages.

The one or more notification control parameters (203) are stored in the notification control message. The notification control message is then signed with the private key (202) in order to indicate authenticity of the sender (the notification control server) to the recipient (the mobile communications device). The notification control parameters provide actual values, relative or absolute, for one or more controlled notification settings, such as "set volume to maximum" (absolute) or "set volume 5 higher than current setting" (relative). A control parameter also might include "select ringtone #8", or "set screen brightness to maximum", or "flash screen at full brightness", as described in the foregoing paragraphs.

Optionally, the notification control message (199) may also include notification data (204), such as metadata. In this area of the message, an actual ringtone could be carried, such as a digital audio file. The digital audio file could be a series of tones, sounds, or both, which elicit immediate attention, such as a Klaxon™ siren, or could be a voice recording containing an audible message, such as "Alert! Alert! Emergency message."

Finally, the exemplary message has a footer or closing section to indicate the proper end of the message, so that the message recipient can be certain that the entire message has been received. Such a footer or closing may include, for example, a checksum value so that bit errors in transmission of the message might be detected.

Figure 4:
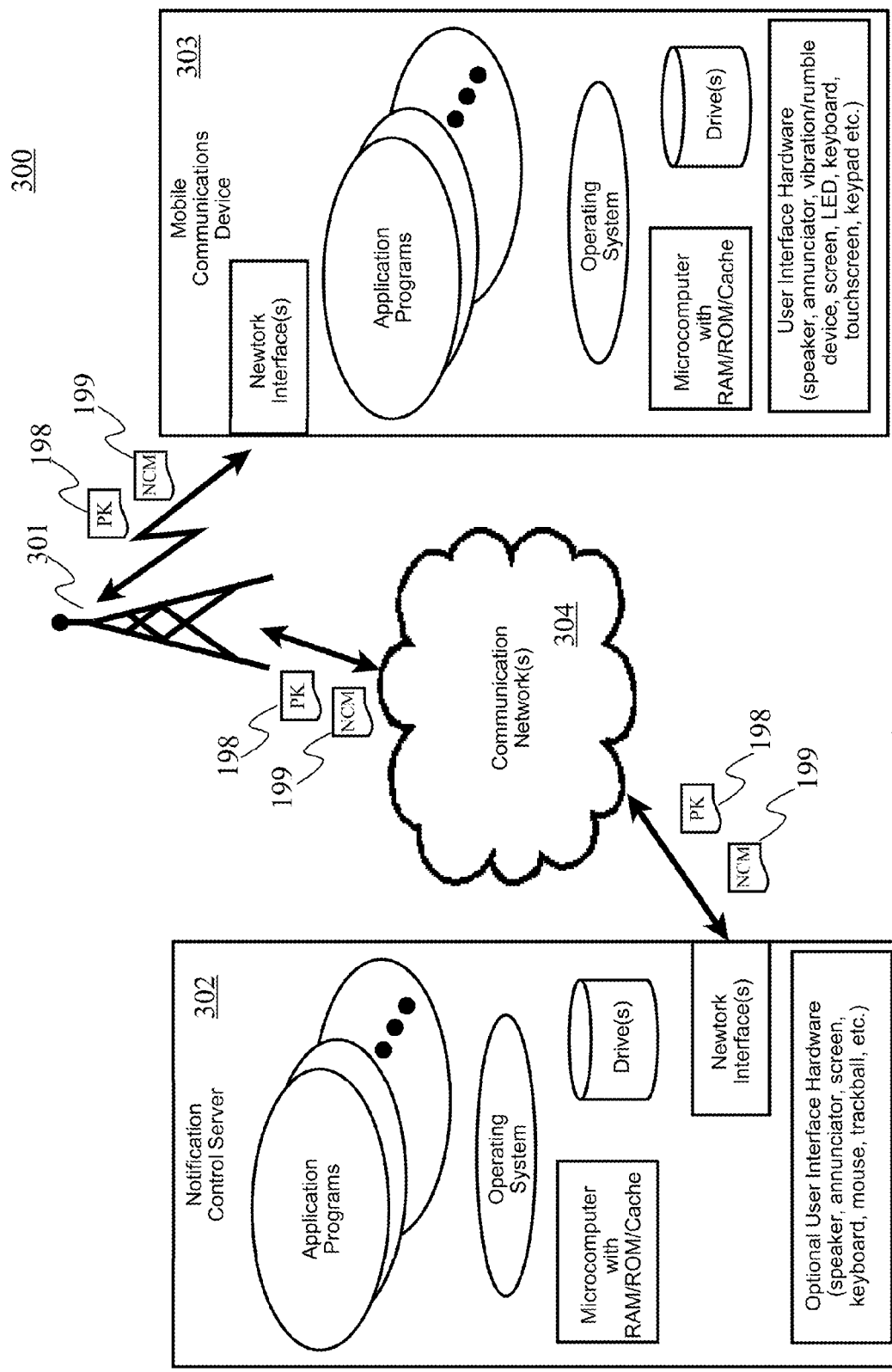
FIG. 4 sets forth a generalized arrangement of components according to the invention, including a notification control server, one or more communications networks, and a mobile communications device.

Referring now to FIG. 4, an arrangement (300) of components according to at least one embodiment of the invention is shown, in which a Notification Control Server (302) is provided with a microcomputer with tangible, computer-readable memory devices (RAM, ROM, etc.), optional data storage drives, optional user interface devices (keyboard, speaker(s), display screen, mouse, etc.), and one or more network interfaces. The NCS (302) is also provided with an operating system and one or more application programs in this exemplary embodiment.

Similarly, the Mobile Communications Device (303) is also provided with a microcomputer with tangible, computer-readable memory device(s), optional drive(s), and one or more user notification and interface devices (speaker, annunciator, vibrator or rumbler, screen, LED, keyboard, touchscreen, keypad, etc.). It, too, may be provided with an operating system, one or more application programs, and at least one network interface.

Disposed communicably between the Notification Control Server (302) and the Mobile Communications Device (303) is one or more communications network(s) (304), such as the switched telephone network (PSTN), a cellular telephone network (AMPS, PCS, GSM, Edge, etc.), and a data network (LAN, WiFi, WAN, Internet, Intranet, VPN, etc.).

The Notification Control Server (302) thereby communicates the Notification Control Message(s) (199) and the authentication key(s) (198) to the Mobile Communications Device (303) via the network(s) (304), as previously described.

Suitable Computing Platform

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
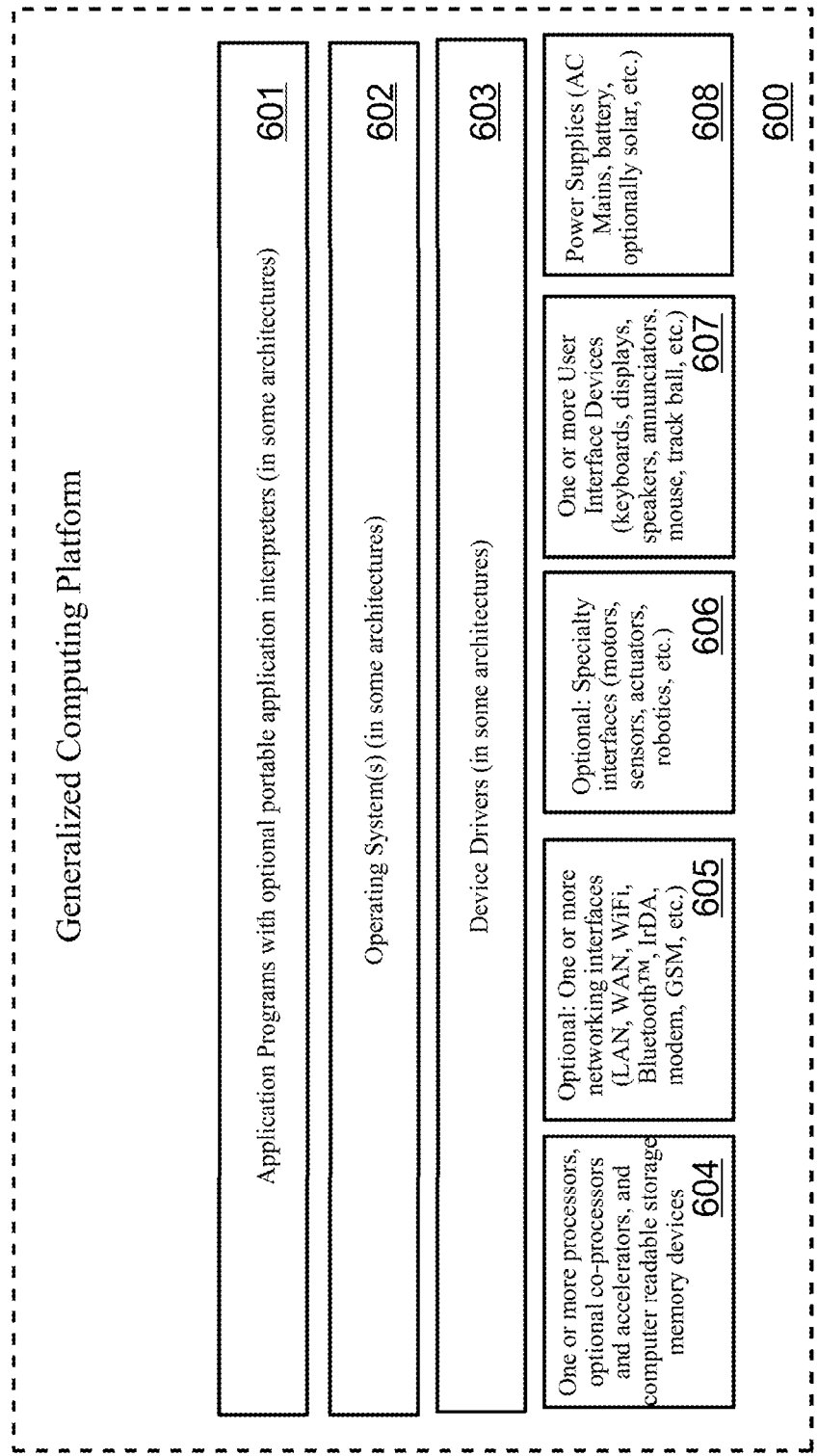
FIG. 5 illustrates the general architecture of processor-based systems including consumer electronic devices as well as server computers.

The present invention may be realized for many different processors used in many different computing platforms. FIG. 5 illustrates a generalized computing platform (600), such as common and well-known computing platforms such as "Personal Computers", web servers such as an IBM iSeries™ server, and portable devices such as personal digital assistants and smart phones, running a popular operating systems (602) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known and openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (601) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (604) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (605) may be provided, as well as specialty interfaces for specific applications. If the computing platform is intended to interact with human users, it is provided with one or more user interface devices (607), such as display(s), keyboards, pointing devices, speakers, etc.

And, each computing platform requires one or more power supplies (battery, AC mains, solar, etc.).

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for a network service provider computer to remotely override and control user notification settings of a mobile communications device, the method comprising:

establishing a public and private authentication key pair by a server computer for a specific mobile communication device;

transmitting the public authentication key to the specific mobile communication device to establish a trusted relationship;

responsive to an event or signal requiring overriding of user notification settings of a mobile communications device, preparing a notification control message by the server computer including at least one notification control parameter inserted into a first metadata area of the first notification control message, wherein the notification control parameter commands an overriding change in a user notification setting of the specific mobile communications device, embedding a digital audio file into a metadata area of the notification control message, and signing the notification control parameter with the private key; and transmitting by the server computer to the specific mobile communications device first notification control message, thereby causing the mobile communications device to implement and override one or more user notification settings according to the at least one notification control parameter including employing the extracted digital audio file as an audible alert message; and subsequent to a pre-determined time period and responsive to detecting no interaction by a user with the mobile communications device, transmitting a second notification control message by the server computer to the mobile communication device including a second notification control parameter inserted into a second metadata area, thereby causing the mobile communications device to override one or more user notification settings according to the second notification control parameter.

2. The method as set forth in claim 1 wherein the notification control parameter contains at least one parameter selected from the group consisting of a relative volume change command, an absolute volume change command, a relative screen brightness change command, an absolute screen brightness command, a rumble device strength command, a rumble device pattern command, and a ringtone selection change command.

3. The method as set forth in claim 1 wherein the preparing of a first notification control message further comprises preparing a data portion of the notification control message.

4. The method as set forth in claim 3 wherein the data portion of the first notification control message comprises at least one data portion selected from the group consisting of an audio recording and a ringtone sequence.

* * * * *